US012583311B1

(12) United States Patent
Chen et al.

(10) Patent No.: US 12,583,311 B1
(45) Date of Patent: Mar. 24, 2026

(54) WIRELESS IN-WHEEL MOTOR DRIVE AND METHOD FOR OPTIMIZING THE SAME

(71) Applicant: City University of Hong Kong, Hong Kong (HK)

(72) Inventors: Xin Chen, Hong Kong (HK); Chi Kong Tse, Hong Kong (HK)

(73) Assignee: City University of Hong Kong, Hong Kong (HK)

( * ) Notice: Subject to any disclaimer, the term of this patent is extended or adjusted under 35 U.S.C. 154(b) by 0 days.

(21) Appl. No.: 19/062,042

(22) Filed: Feb. 25, 2025

(51) Int. Cl.
| | |
|---|---|
| B60K 7/00 | (2006.01) |
| B60L 15/00 | (2006.01) |
| B60L 15/02 | (2006.01) |
| H02J 50/12 | (2016.01) |
| H02J 50/70 | (2016.01) |
| H02P 27/12 | (2006.01) |

(52) U.S. Cl.
CPC .......... B60K 7/0007 (2013.01); B60L 15/007 (2013.01); B60L 15/02 (2013.01); H02J 50/12 (2016.02); H02J 50/70 (2016.02); H02P 27/12 (2013.01); *B60L 2210/42* (2013.01)

(58) Field of Classification Search
CPC . H02J 50/12; H02J 50/70; B60L 15/02; B60L 15/007; B60K 7/0007
See application file for complete search history.

(56) References Cited

U.S. PATENT DOCUMENTS

| | | | | |
|---|---|---|---|---|
| 9,457,788 | B2 * | 10/2016 | Yukawa | B60W 10/26 |
| 10,421,351 | B2 * | 9/2019 | Fujimoto | H02K 7/14 |
| 11,979,031 | B2 * | 5/2024 | Labbe | H02J 50/402 |
| 2010/0256946 | A1 * | 10/2010 | Carresjo | B60C 23/0474 |
| | | | | 702/138 |
| 2017/0222488 | A1 * | 8/2017 | Madawala | H02J 7/00712 |
| 2018/0109149 | A1 * | 4/2018 | Murayama | B60L 53/126 |
| 2018/0212463 | A1 * | 7/2018 | Van Boheemen | H02J 50/80 |

* cited by examiner

*Primary Examiner* — Daniel Cavallari
*Assistant Examiner* — Joseph N Inge
(74) *Attorney, Agent, or Firm* — Idea Intellectual Limited; Sam T. Yip

(57) ABSTRACT

The present invention provides a wireless soft-switching in-wheel motor drive system and a method for realizing the same. The method comprises pre-misaligning the primary winding and the secondary winding of a magnetic coupler of the in-wheel motor drive system for an angular offset such that an input impedance of the resonant compensation network of the in-wheel motor drive system has a short-circuit boundary frequency less than an open-circuit boundary frequency throughout a target misalignment tolerance between the primary winding and the secondary winding. The present invention can ensure soft switching of the in-wheel motor drive system, save system volume, minimize power losses, and achieve high efficiency.

11 Claims, 12 Drawing Sheets

30

30

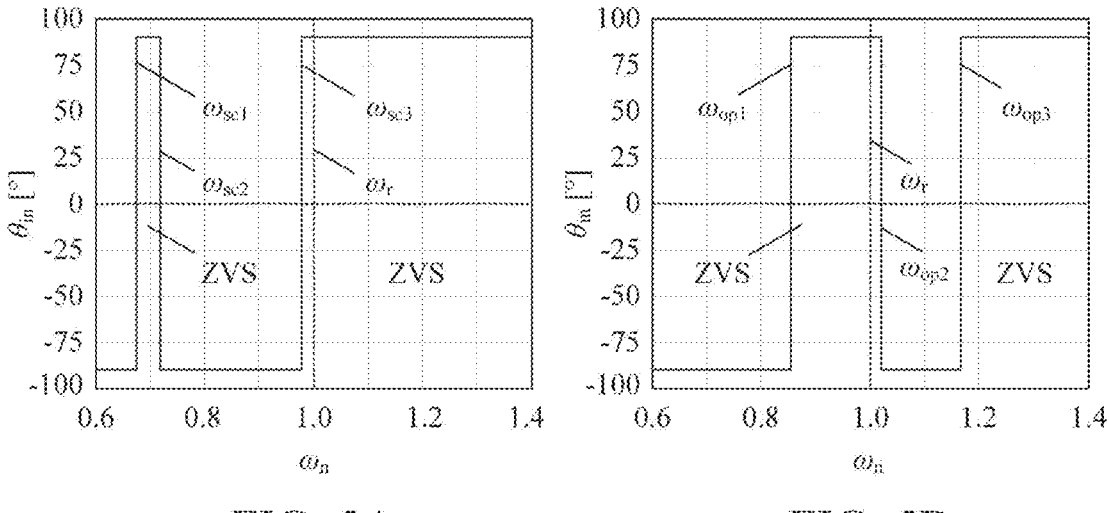
FIG. 5A                    FIG. 5B

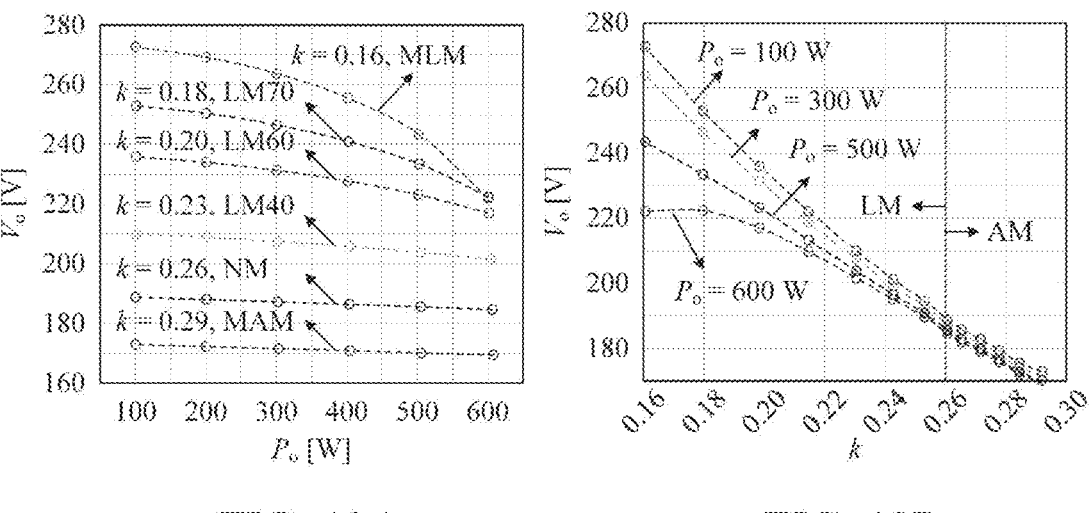
FIG. 13A                    FIG. 13B
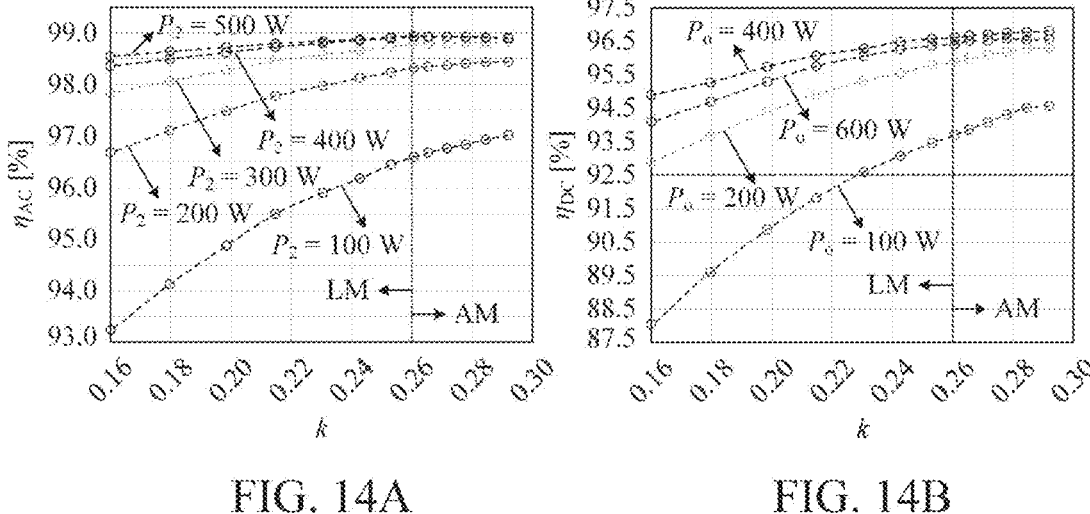
FIG. 14A                    FIG. 14B

WIRELESS IN-WHEEL MOTOR DRIVE AND METHOD FOR OPTIMIZING THE SAME

FIELD OF THE INVENTION

The present invention generally relates to motor drive system. More specifically the present invention relates to an in-wheel motor drive system based on wireless power transfer techniques.

BACKGROUND OF THE INVENTION

Wireless motor drive systems have drawn increasing attention. In contrast to conventional motor drive systems relying on power cables, wireless motor drive systems transfer power through magnetic fields, eliminating issues like sparks and wire cuts inherent in traditional systems. Moreover, wireless motor drives enable both power transmission and electrical isolation, enhancing the system's safety and reliability.

A typical application of wireless motor drives is for in-wheel motors. Compared with conventional centralized motor drive systems, the in-wheel motor structure has notable benefits, such as controlling four wheels independently and eliminating the need for a transmission system. Therefore, this configuration offers the advantages of compact design, enhanced torque response, and improved efficiency. However, the power cables connecting the vehicle body and the in-wheel motor are usually exposed to the ambient environment. As a result, these wires are susceptible to damage and disconnection risk, particularly in severe weather and rugged road conditions. Wireless in-wheel motor drive systems, with encapsulated transmitter and receiver components, effectively mitigate environmental influences.

Despite the promise of wireless in-wheel motor drive systems, numerous challenges still exist. During the vehicle operation, there will be misalignment between transmitter and receiver coils, which are separately positioned in the vehicle body and the wheel. As a result, system parameters will change with the misalignment, leading to significant bus voltage fluctuations and efficiency degradation. Existing solutions prefer to use the series/series compensation topology for the resonant tank. The load-independent current properties of the series/series compensation will exacerbate voltage fluctuation issues. Therefore, additional DC/DC converters are used for voltage stabilization, and high-frequency wireless communication is required for signal feedback.

However, the additional DC/DC converters will increase the system volume and introduce extra power losses, resulting in a limited power density and low efficiency. Meanwhile, the wireless communication will increase the system cost and introduce significant feedback delay in the control loop. The increased delay time will affect the motor dynamic performance. On top of the low efficiency and slow dynamic response, hard switching is easy to occur due to complex operational conditions, resulting in severe electromagnetic interference problems and significant switching losses.

SUMMARY OF THE INVENTION

It is an objective of the present invention to provide a solution for wireless in-wheel motor drive systems to solve the aforementioned technical problems, ensure soft switching of the in-wheel motor drive systems, save system volume and minimize power losses, and achieve high efficiency.

In accordance with a first aspect of the present invention, a wireless soft-switching in-wheel motor drive system is provided. The system comprises: a vehicle-body side including a vehicle-body-side series resonant capacitor $C_P$; a wheel side including a wheel-side series resonant capacitor $C_r$ and a wheel-side parallel resonant capacitor $C_S$; and a magnetic coupler configured for transferring power from the vehicle-body side to the wheel side under a switching frequency. The magnetic coupler includes: a primary winding electrically connected in series to the vehicle-body-side series resonant capacitor $C_P$; and a secondary winding electrically connected in series to the wheel-side series resonant capacitor $C_r$ and in parallel to the wheel-side parallel resonant capacitor $C_S$. A resonant compensation network is formed of the vehicle-body-side series resonant capacitor $C_P$, the wheel-side series resonant capacitor $C_r$, the wheel-side parallel resonant capacitor $C_S$, a self-inductance $L_p$ of the primary winding, a self-inductance $L_S$ of the secondary winding and a mutual inductances M between the primary winding and the secondary winding. The primary winding and the secondary winding are pre-misaligned with an angular offset such that an input impedance of the resonant compensation network has a short-circuit boundary frequency $\omega_{sc3}$ less than an open-circuit boundary frequency $\omega_{op2}$ throughout a target misalignment tolerance between the primary winding and the secondary winding. The switching frequency is selected between the short-circuit boundary frequency and the open-circuit boundary frequency. The self-inductances and mutual inductances of the primary winding and the secondary winding are adjusted with virtual parameters such that a difference between the short-circuit boundary frequency $\omega_{sc3}$ and the open-circuit boundary frequency $\omega_{op2}$ is greater than a target soft switching frequency band throughout the target misalignment tolerance and target operational load conditions.

In accordance with a second aspect of the present invention, a method is provided for realizing soft switching and optimizing efficiency of a wireless in-wheel motor drive system comprising a vehicle-body side, a wheel side and a magnetic coupler configured for transferring power from the vehicle-body side to the wheel side under a switching frequency. The method comprises: forming a resonant compensation network by: electrically connecting a primary winding of the magnetic coupler n series to a vehicle-body-side series resonant capacitor $C_P$; and electrically connecting a secondary winding in series to a wheel-side series resonant capacitor $C_r$ and in parallel to a wheel-side parallel resonant capacitor $C_S$; pre-misaligning the primary winding and the secondary winding of the magnetic coupler for an angular offset such that an input impedance of the resonant compensation network has a short-circuit boundary frequency $\omega_{sc3}$ less than an open-circuit boundary frequency $\omega_{op2}$ throughout a target misalignment tolerance between the primary winding and the secondary winding; selecting the switching frequency to be between the short-circuit boundary frequency and the open-circuit boundary frequency; and adjusting self-inductances and mutual inductances of the primary winding and the secondary winding with virtual parameters such that a difference between the short-circuit boundary frequency $\omega_{sc3}$ and the open-circuit boundary frequency $\omega_{op2}$ is greater than a target soft switching frequency band throughout the target misalignment tolerance and target operational load conditions.

BRIEF DESCRIPTION OF THE DRAWINGS

Embodiments of the invention are described in more details hereinafter with reference to the drawings, in which:

FIGS. 5A and 5B illustrate the input phase angle of the wireless in-wheel motor drive system under short-circuit conditions and open-circuit conditions, respectively;

FIGS. 13A and 13B illustrate the measured voltage curves of the wireless in-wheel motor drive system against the load variation and the coupling coefficient variation, respectively; and FIGS. 14A and 14B illustrate measured AC efficiency and DC efficiency curves of the wireless in-wheel motor drive system.

DETAILED DESCRIPTION

In the following description, details of the present invention are set forth as preferred embodiments. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Figure 1:
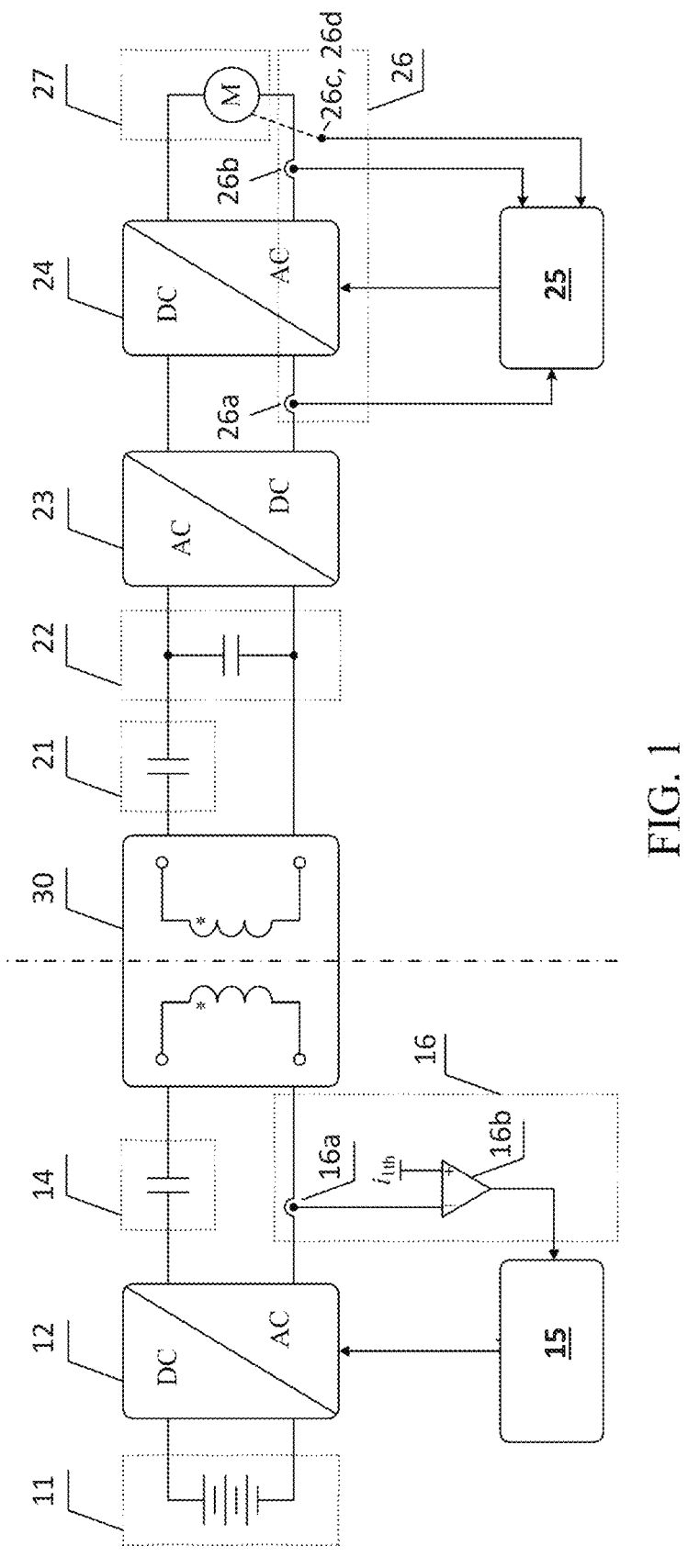
FIG. 1 illustrates a block diagram of a wireless in-wheel motor drive system in accordance with one embodiment of the present invention.

FIG. 1 illustrates a block diagram of a wireless in-wheel motor drive system in accordance with one embodiment of the present invention. As shown, the wireless in-wheel motor drive system includes a vehicle body side subsystem 10, a wheel side subsystem 20 and magnetic coupler 30 configured to facilitate energy coupling between the vehicle body side subsystem and the wheel side subsystem.

In the vehicle body side subsystem, a voltage source inverter 12 is configured to convert an input DC voltage from a DC voltage source 11, such as a battery module, into an AC voltage.

A series resonant capacitive unit 14 is inserted between the voltage source inverter 12 and the magnetic coupler 30.

The magnetic coupler 30 transmits power wirelessly based on the electromagnetic induction principle.

A vehicle-body-side controller 15 is electrically connected to the voltage source inverter and configured to generate control signals for controlling the voltage source inverter. A fixed frequency and duty cycle control signal is provided by the vehicle-body-side controller 15 to avoid the use of high-frequency wireless communication and simplify the system control.

A current protection module 16 is configured to detect the input current of the magnetic coupler 30 to avoid the overcurrent issue. The current protection module 16 comprises an AC current sensor 16a configured for detecting a current flowing through the primary winding and a comparator 16b configured for determining whether the detected current exceeds a threshold value. When the detected current exceeds a threshold value $i_{1\_th}$, the vehicle-body-side controller 15 is configured to generate an overcurrent protection signal for turning off the voltage source inverter 12 when the detected current is determined to exceed the threshold value.

In the wheel side subsystem, a series resonant capacitive unit 21 and a parallel resonant capacitive unit 22 are placed between the magnetic coupler 30 and a rectifier module 23. The wheel-side series resonant capacitive unit 21 and the wheel-side parallel resonant capacitive unit 22 cooperate with the vehicle-body-side series resonant capacitive unit 14 to help improve the system power transfer capacity and efficiency. The rectifier module 23 converts the high-frequency AC power into DC power for the motor drive module 24 electrically connected to the rectifier module. After that, the motor drive module 24 converts the DC power to low-frequency AC power for motor excitation. The wheel-side controller 25 is configured to receive feedback signals from a wheel-side sensing circuit 26 and implement control algorithms and modulation strategies to drive the electric motor 27.

The wheel-side sensing circuit 26 may include a DC voltage sensor 26a configured to detect the bus voltage $V_o$, a AC current sensor 26b configured to detect the winding currents $i_A$ and $i_B$ of the motor 27, a DC current sensor 26c configured to detect a DC current indicative of position $\theta$ and speed n of the in-wheel motor 27 and an encoder 26d configured to encode the detected DC current to obtain the motor position $\theta$ and speed n. With the wheel-side feedback signals ($V_{o\_fb}$, $i_{A\_fb}$, $i_{B\_fb}$, $\theta_{fb}$, and $n_{fb}$), the wheel-side controller 25 utilizes the field-oriented control and the space vector pulse width modulation to provide gate drive signals for the three-phase voltage source inverter 24.

The electric motor 27 may be configured as a permanent magnet synchronous motor, an induction motor, a switching reluctance motor, a brushless DC motor, a step motor, or any other suitable types of electric motors. The electric motor 27 may be implemented with a single-phase winding structure, three-phase winding structure, five-phase winding structure, or any other applicable winding structures.

The voltage source inverter 12 on the vehicle body side can be a half-bridge inverter, a full-bridge inverter, a push-pull inverter, or any other suitable circuit topologies with voltage source properties and converting DC power to high-frequency AC power.

The vehicle-body-side current (or primary current) of the magnetic coupler 30 is detected and compared to a preset threshold value for the vehicle-body-side controller to generate overcurrent protection signals.

Preferably, the vehicle-body-side controller generates signals with fixed frequencies and fixed duty cycles for the voltage source inverter.

The vehicle-body-side series resonant capacitive unit 14 is configured to cancel out the total reactance reflected from the wheel-side coil and the wheel-side capacitive units, and may be composed of a single capacitor or a combination of multiple capacitors.

The wheel-side series resonant capacitive unit 21 is configured to partially cancel out the reactance of the wheel-side coil, and may be composed of a single capacitor or a combination of multiple capacitors.

The wheel-side parallel resonant capacitive unit 22 is configured to cancel out the total reactance of the wheel-side coil and the wheel-side series resonant capacitive unit, and may be composed of a single capacitor or a combination of multiple capacitors.

The magnetic coupler 30 preferably utilizes electromagnetic induction principles to achieve wireless power transmission. The magnetic coupler 30 may have cores made of magnetic materials such as silicon steel sheets, ferrite cores, microcrystalline cores, nanocrystalline cores, and permalloy cores; or non-magnetic materials such as air, ceramic, and plastic. The magnetic coupler may have coils made of solid conductors, Litz wires, copper foil, PCB windings, or other conductor materials.

The rectifier module 23 can adopt a full-bridge structure, a half-bridge structure, the full-wave structure, a voltage-doubler structure, a current-doubler structure, or any other suitable rectifier structures.

The motor drive module 24 can be configured as a voltage source inverter, a current source inverter, a matrix converter, or any other suitable motor drive converters.

Figure 2:
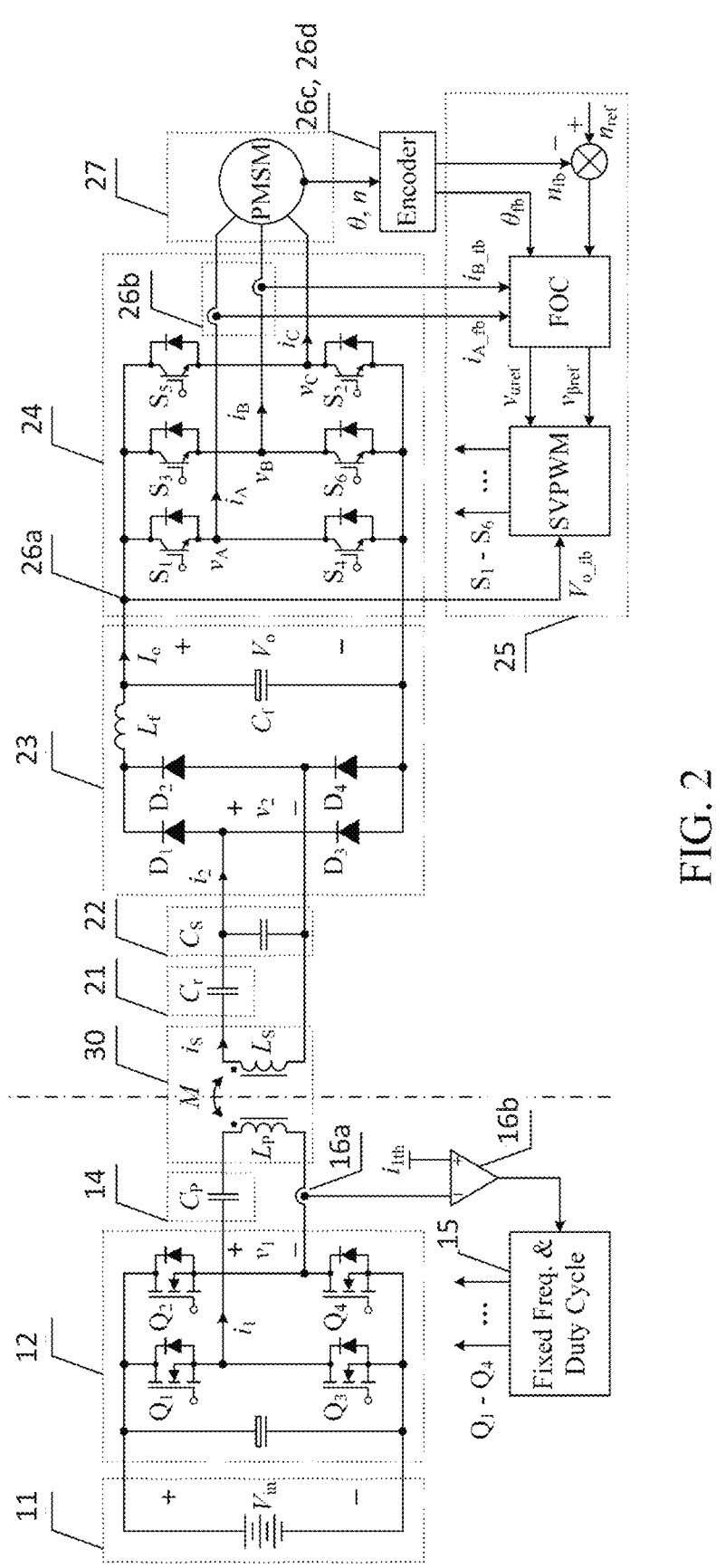
FIG. 2 illustrates an exemplary embodiment of the wireless in-wheel motor drive system.

FIG. 2 illustrates an exemplary embodiment of the wireless in-wheel motor drive system. In this embodiment, the voltage source inverter is realized as a full-bridge voltage source inverter 12. Also, the rectifier module is realized as a full-bridge diode rectifier 23, the motor drive module is realized as a three-phase voltage source inverter 24, and the electric motor is realized as a permanent magnet synchronous motor 27.

In FIG. 2, vehicle-body-side series resonant capacitor $C_P$, vehicle-body-side self-inductance $L_p$, wheel-side series resonant capacitor $C_r$, wheel-side parallel resonant capacitor $C_S$, wheel-side self-inductance $L_S$, and the mutual inductance M form the resonant compensation network.

Figure 3A:
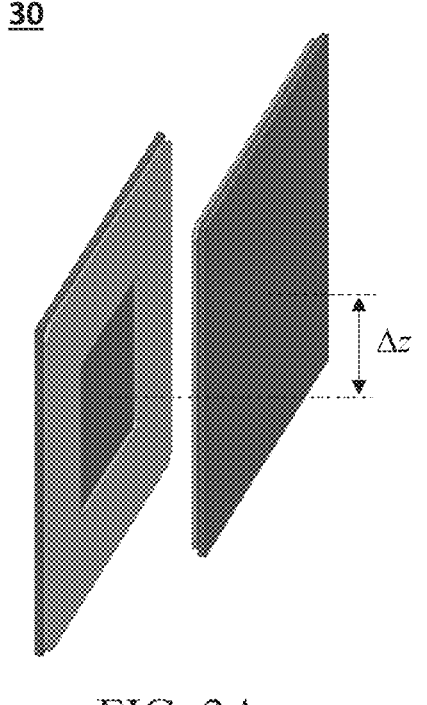
FIG. 3A illustrates lateral misalignment scenarios with $\Delta z$ representing the misalignment distance between core centers of the primary and secondary windings.

In practical applications, misalignment between the vehicle-body-side coil and the wheel-side coil occurs with rugged road conditions or wheel direction changes. FIG. 3A

Figure 3B:
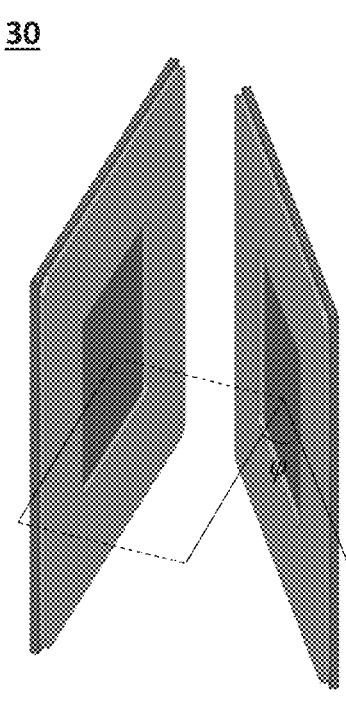
FIG. 3B illustrates angular misalignment scenarios with $\varphi$ representing the misalignment angle between core centers of the primary and secondary windings.

6 illustrates lateral misalignment scenarios with $\Delta z$ representing the misalignment distance between core centers of the primary and secondary windings of the magnetic coupler 30. FIG. 3B illustrates angular misalignment scenarios with $\varphi$ representing the misalignment angle between core centers of the primary and secondary windings of the magnetic coupler 30.

Mapping the misalignment positions to circuit parameters, coefficients $\delta_P$, $\delta_S$, and $\delta_M$ are introduced to represent the variation of circuit parameters, and subscript "0" is used to denote circuit parameters at the initial design point. Then self-inductances $L_P$ and $L_S$, mutual inductance M, and coupling coefficients k under various misalignment positions can be expressed as $$L_P = \delta_P L_{P0}, \; L_s = \delta_S L_{S0}, \; M = \delta_M M_0, \; k = \frac{\delta_M}{\sqrt{\delta_P \delta_S}} k_0. \tag{1}$$

For simplicity, inductance coefficient $\lambda$, quality factor $Q_{S0}$, and normalized switching frequency $\omega_n$ are introduced and defined as $$\lambda = \frac{L_0}{L_{S0}}, \; Q_{S0} = \frac{R_E}{\omega_0 L_{S0}}, \; \omega_n = \frac{\omega}{\omega_r}. \tag{2}$$

Based on (1) and (2), the DC voltage gain and input impedance with misalignment consideration are obtained as $$G_{vD} = \frac{8}{\pi^2} \frac{\omega_n^2 \delta_M \dfrac{\lambda^2}{1-\lambda} \dfrac{k_0^2}{\lambda - k_0^2}}{\Delta_1 + \left(\dfrac{\lambda \omega_n^2 \delta_P}{\lambda - k_0^2} - 1\right)\dfrac{\lambda}{1-\lambda} + \dfrac{\lambda \Delta_1}{j\omega_n Q_{S0}}} \frac{L_{S0}}{M_0} \tag{3}$$

$$Z_{in} = \frac{\Delta_1 + j\omega_n Q_{S0}\left[\dfrac{\Delta_1}{\lambda} + \dfrac{(\omega_n^2 \delta_P - 1)\lambda + k_0^2}{(\lambda - k_0^2)(1-\lambda)}\right]}{\dfrac{\lambda \omega_n Q_{S0} k_0^2}{\lambda - k_0^2}\left[\dfrac{\omega_n Q_{S0}(1 - \omega_n^2 \delta_S)}{\lambda(1-\lambda)} + j\left(\dfrac{\omega_n^2 \delta_S}{1-\lambda} - 1\right)\right]} \frac{M_0^2 R_E}{L_{S0}^2} \tag{4}$$

where $$\Delta_1 = -\omega_n^4 \delta_P \delta_S \frac{\lambda(1-k^2)}{(\lambda - k_0^2)(1-\lambda)} + \omega_n^2\left(\frac{\lambda \delta_P}{\lambda - k_0^2} + \frac{\delta_S}{1-\lambda}\right) - 1. \tag{5}$$

Moreover, efficiency $\eta_{AC}$ and optimal load conditions $Q_{S0opt}$ and $R_{Lopt}$ can be derived as $$\frac{1}{\eta_{AC}} = 1 + \frac{R_S}{\omega_0 L_{S0} Q_{S0}} + \frac{\omega_\eta^2 Q_{S0} R_S}{\lambda^2 \omega_0 L_{S0}} + $$

$$\left(\omega_\eta^2 \delta_S - 1 + \lambda + \frac{\omega_\eta^2 R_S Q_{S0}}{\lambda \omega_0 L_{S0}}\right)^2 \frac{R_P L_{S0}}{\omega_\eta^4 \delta_M^2 M_0^2 \omega_0 Q_{S0}} + $$

$$\left(\frac{\omega_\eta^2 \delta_S - 1}{\lambda} - \frac{R_S}{\omega_0 L_{S0} Q_{S0}}\right)^2 \frac{L_{S0} Q_{S0} R_P}{\omega_0 \omega_\eta^2 \delta_M^2 M_0^2} \tag{6}$$

$$\begin{cases} Q_{S0opt} = \dfrac{\lambda}{\omega_n}\sqrt{1 + \dfrac{\lambda^2 + 2\lambda\left(\omega_n^2\delta_S - 1\right)}{\omega_n^4\left(\delta_S^2 + \delta_M^2\dfrac{M_0^2}{L_{S0}^2}\dfrac{R_s}{R_P}\right) + \omega_n^2\left(\dfrac{R_S^2}{\omega_0^2 L_{S0}^2} - 2\delta_S\right) + 1}} \cdot \\ R_{Lopt} = \dfrac{8}{\pi^2}\omega_s L_{S0} Q_{S0opt} \end{cases} \quad (7)$$

Based on the fundamental harmonic approximation method, the AC voltage gain of the S/CP compensation is $$G_{vA} = \frac{\dot{V}_2}{\dot{V}_1} = \frac{\omega_s^2 M C_P C_r}{\Delta_1 C_S + \left(\omega_s^2 L_P C_P - 1\right)C_r + \dfrac{\Delta_1}{j\omega_s R_E}} \quad (8)$$

where $\omega_s = 2\pi f_s$ is the switching frequency and $R_E = \pi^2 R_L/8$ is the rectifier equivalent resistance.

Besides, the medium variable $\Delta_1$ is defined as $$\Delta_1 = -\omega_s^4 L_P C_S C_P C_r (1 - k^2) + \omega_s^2 (L_P C_P + L_S C_r) - 1. \quad (9)$$

The DC voltage gain $G_{vD}$ of the system can be expressed with $G_{vA}$, as given by $$G_{vD} = \frac{V_o}{V_{in}} = \frac{8}{\pi^2} G_{vA}. \quad (10)$$

The input impedance of the resonant compensation network is expressed as $$Z_{in} = \frac{\Delta_1 + j\omega_s R_E\left[\Delta_1 C_S + \left(\omega_s^2 L_P C_P - 1\right)C_r\right]}{\omega_s C_P\left[\omega_s R_E \Delta_2 + j\left(\omega_s^2 L_S C_r - 1\right)\right]} \quad (11)$$

where $$\Delta_2 = C_S + C_r - \omega_s^2 L_S C_S C_r. \quad (12)$$

To simultaneously achieve load-independent voltage output and zero input phase angles, the switching frequency $\omega_s$ needs to be equal to the resonant frequency $\omega_r$ $$\omega_r = \frac{1}{\sqrt{\left(L_P - \dfrac{M^2}{L_{r0}}\right)C_P}} = \frac{1}{\sqrt{L_{r0}C_S}} = \frac{1}{\sqrt{(L_S - L_{r0})C_r}} \quad (13)$$

where $L_{r0}$ is the equivalent inductance of the wheel-side coil and satisfies $$L_{r0} = L_S - \frac{1}{\omega_r^2 C_r}. \quad (14)$$

Figure 4:
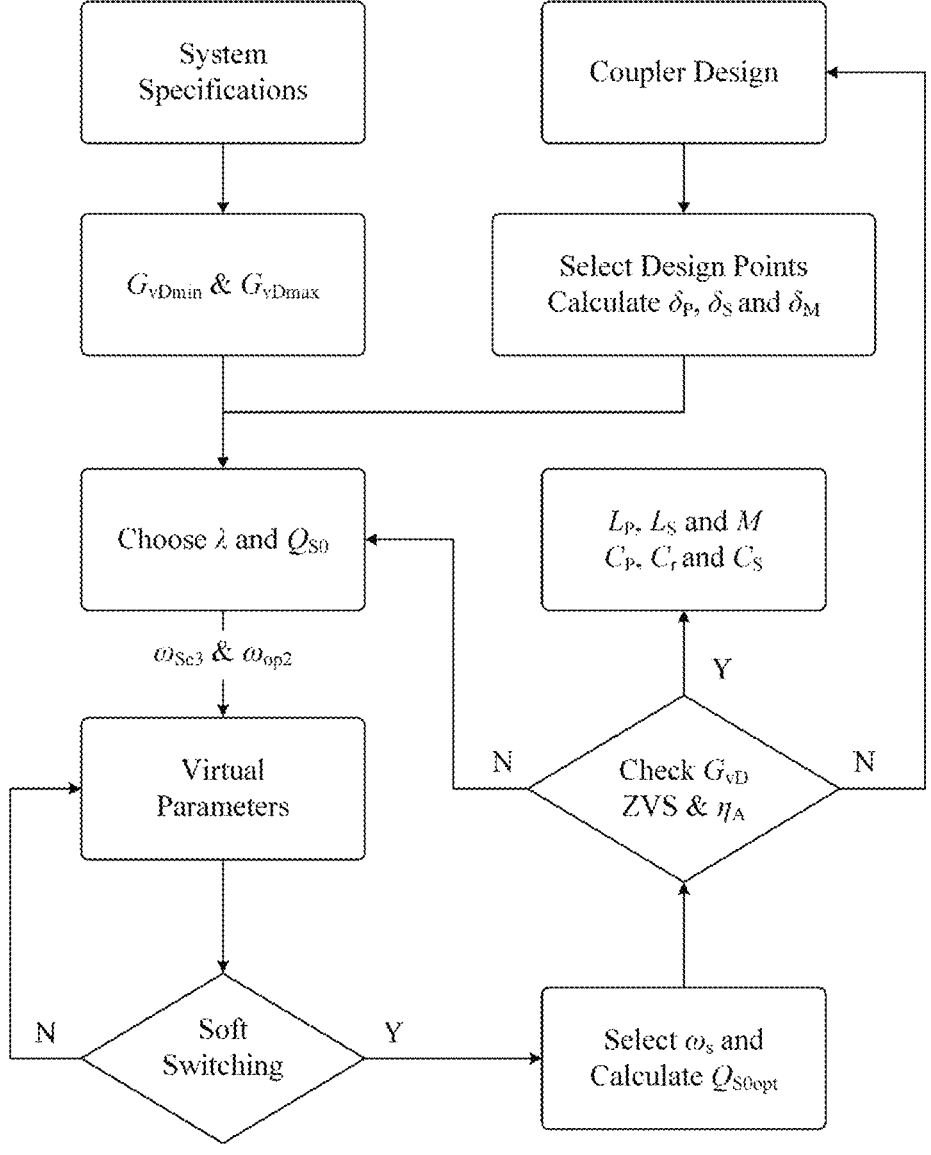
FIG. 4 illustrates a design flow chart for realizing soft switching of a wireless in-wheel motor drive system in accordance with one embodiment of the present invention.

FIG. 4 illustrates a design flow chart for realizing soft switching of a wireless in-wheel motor drive system. At the beginning, maximum voltage gain $G_{vDmax}$ and minimum voltage gain $G_{vDmin}$ should be taken from system specifications. Besides, a pre-design of the magnetic coupler based on the vehicle dimension is required. Due to large air gaps between vehicle-body-side coils and wheel-side coils, and non-linear properties of magnetic cores, obtaining accurate models of the magnetic coupler is rather difficult. Therefore, the magnetic coupler is usually designed based on electromagnetic software.

As the parameters of the magnetic coupler may change during the vehicle operation, a suitable design point should be selected. The soft switching realization is taken as a selection criterion and the input impedance of the resonant compensation network is used for soft switching analysis. We define the input impedance under short-circuit conditions as $Z_{insc}$ and the input impedance with open-circuit conditions as $Z_{inop}$. Besides, the output impedance with a short-circuit input is defined as $Z_{osc}$ and the output impedance with an open-circuit input is defined as $Z_{oop}$. Then, the imaginary part of the input impedance can be expressed as $$\text{Im}(Z_{in}) = \text{Im}(Z_{insc}) \cdot \text{Re}\left(\frac{1 + \dfrac{R_E^2}{|Z_{oop}|^2} \cdot \dfrac{Z_{inop}}{Z_{insc}}}{1 + \dfrac{R_E^2}{|Z_{oop}|^2}}\right) \quad (15)$$

which indicates that the soft switching realization for different load conditions is characterized by both $Z_{insc}$ and $Z_{inop}$ being inductive.

FIG. 5A illustrates the input phase angle of the wireless in-wheel motor drive system under short-circuit conditions. To achieve soft switching, the switching frequency needs to satisfy $$\omega_{sc1} < \omega_n < \omega_{sc2} \text{ or } \omega_n > \omega_{sc3}. \quad (16)$$

FIG. 5B illustrates the input phase angle of the wireless in-wheel motor drive system under open-circuit conditions. To achieve soft switching, the switching frequency needs to satisfy $$\omega_{op1} < \omega_n < \omega_{op2} \text{ or } \omega_n > \omega_{op3}. \quad (17)$$

In (16) and (17), as $\omega_{sc1}$, $\omega_{sc2}$, $\omega_{op1}$, and $\omega_{op3}$ are far from the resonant frequency, which will affect the load-independent output property and system efficiency, so we only focus on $\omega_{sc3}$ and $\omega_{op2}$ in the design. If $\omega_{op2} < \omega_{sc3}$, the overlap region is capacitive, then soft switching will always be lost. To obtain an inductive overlap region for soft switching, the boundary frequency needs to satisfy $$\omega_{sc3} < \omega_n < \omega_{op2} = \sqrt{1/\delta_S}\Big) \quad (18)$$

where $$\omega_{sc3} = \sqrt{\frac{\sqrt{\delta_P^2(1-\lambda)^2 - 2\delta_P\delta_S(1-2k^2)(\lambda - k_0^2)\dfrac{1-\lambda}{\lambda} + \dfrac{\delta_S^2}{\lambda^2}(\lambda - k_0^2)^2} +}{\delta_P(1-\lambda) + \dfrac{\delta_S}{\lambda}(\lambda - k_0^2)}{2\delta_P\delta_S(1-k^2)}} \quad (19)$$

In general, soft switching condition is the input phase angle being larger than zero (i.e., current lags behind voltage). For short-circuit and open-circuit scenarios, the input phase angle can be only 90° or −90°. So, the soft condition for these two scenarios is the input phase angle being 90°.

Figures 6A, 6B, 6C, 6D:
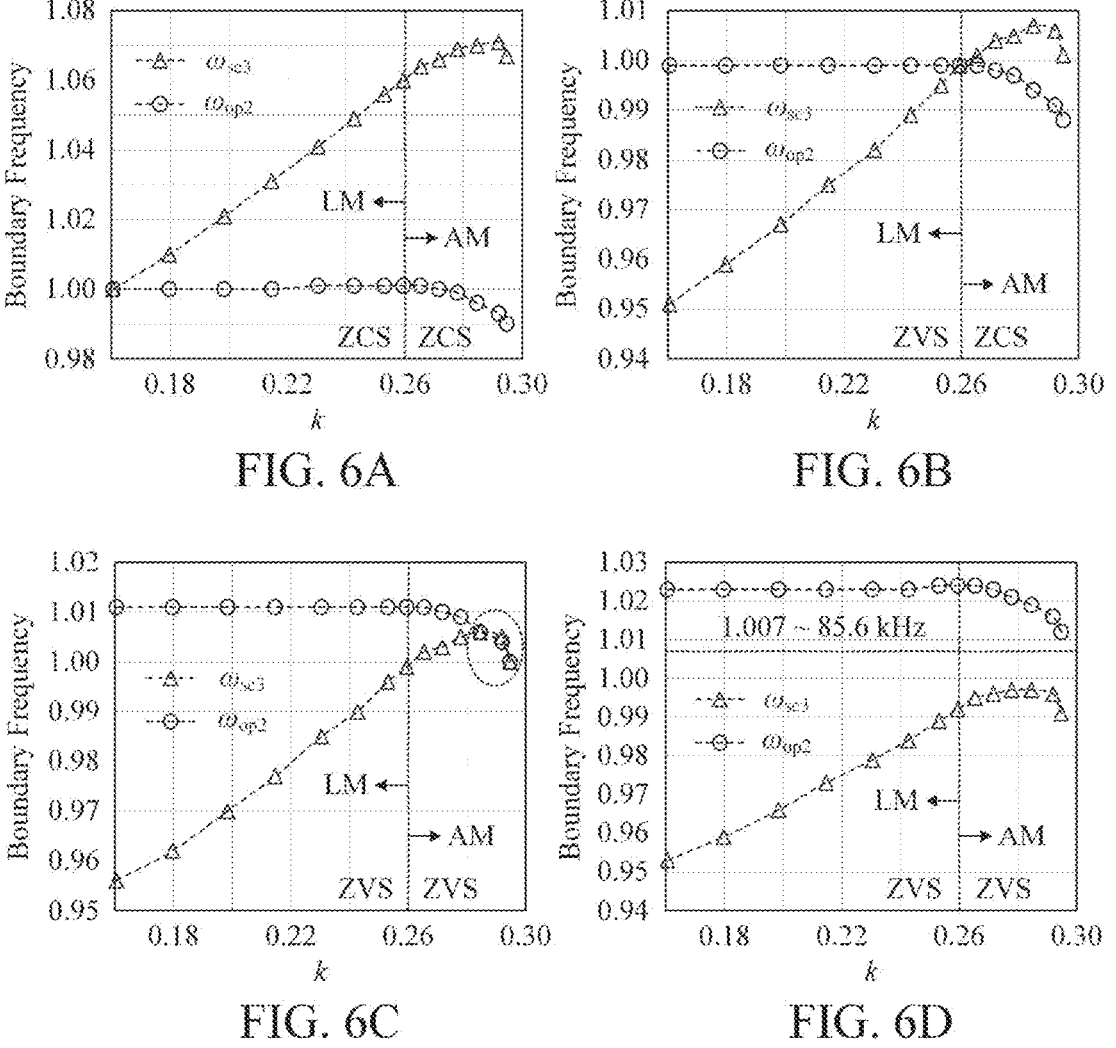
FIG. 6A shows the coupler parameters when the maximum lateral misalignment (LM) is selected as the initial design point.
FIG. 6B shows the coupler parameters when no misalignment (NM) position is selected as the initial design point.
FIG. 6C shows the coupler parameters when the maximum angular misalignment (AM) is selected as the initial design point.
FIG. 6D illustrates the soft switching boundary frequencies of the wireless in-wheel motor drive system designed at the maximum angular misalignment and with virtual parameters according to an exemplary embodiment of the present invention.

With the boundary frequencies $\omega_{sc3}$ and $\omega_{op2}$ derived above, soft switching ranges for three typical positions are given in FIGS. 6A-6C. If the coupler parameters at the maximum lateral misalignment (MLM) are selected as the initial design point, as shown in FIG. 6A, the short-circuit

9 boundary frequency $\omega_{sc3}$ is always larger than the open-circuit boundary frequency $\omega_{op2}$ over the whole misalignment positions. Therefore, there is always a capacitive region around the resonant point, and the soft switching is always lost. If the no misalignment (NM) position is selected as the initial design point, as shown in FIG. 6B, soft switching can only be achieved for the lateral misalignment positions. Notably, by designing the system at the maximum angular misalignment (MAM), soft switching can be achieved throughout the entire range of misalignments, as shown in FIG. 6C. As a result, the maximum angular misalignment is preferred for the system design. FIG. 6D illustrates the soft switching boundary frequencies of the wireless in-wheel motor drive system designed at the maximum angular misalignment and with virtual parameters according to an exemplary embodiment of the present invention.

Figures 7A, 7B, 7C:
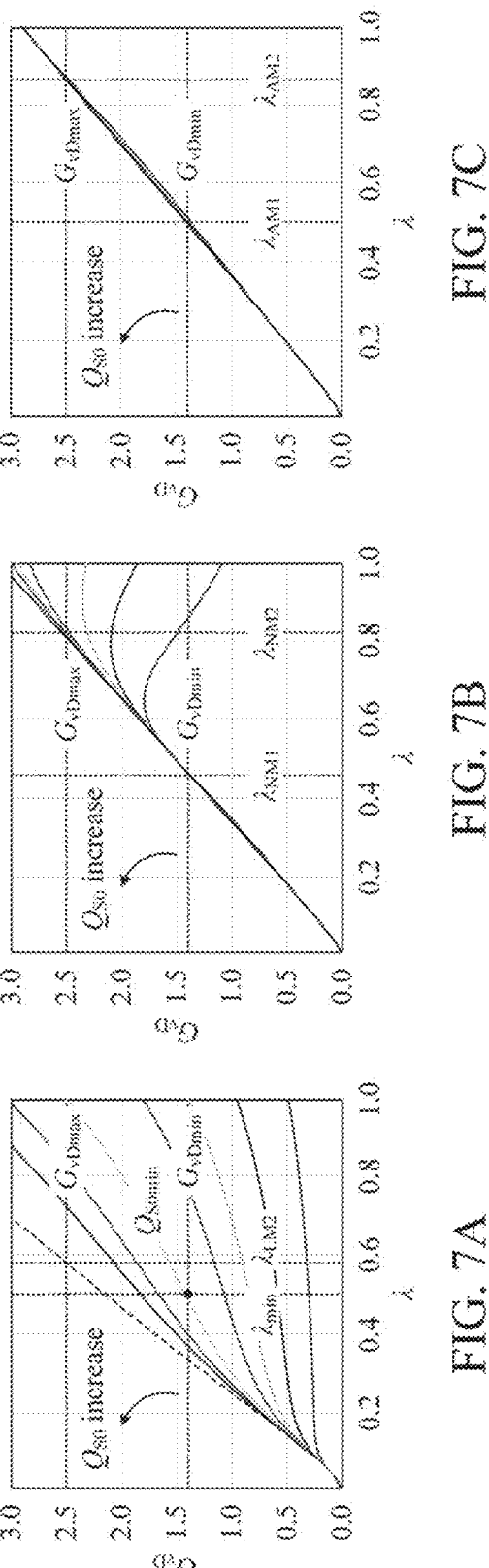
FIGS. 7A to 7C show voltage gain curves of the wireless in-wheel motor drive system for the initial design points being set to maximum lateral misalignment (LM), no misalignment (NM) and maximum angular misalignment (AM), respectively.

After selecting the initial parameters of the magnetic coupler, voltage gain curves based on the expression of (10) are plotted in FIGS. 7A-7C. At the maximum angular misalignment, as shown in FIG. 7C, the voltage gain curves overlap for different inductance coefficients λ and quality factors $Q_{S0}$. Besides, the voltage gain will increase with λ. In order to meet the voltage gain requirement, the value of λ should be within $\lambda_{AM1}$ and $\lambda_{AM2}$. At the no misalignment position, as shown in FIG. 7B, the voltage gain variation trend is similar to that at the maximum angular misalignment. However, the voltage fluctuation becomes severe when λ approaches 1. In order to meet the voltage gain requirement, λ should be within $\lambda_{NM1}$ and $\lambda_{NM2}$.

At the maximum lateral misalignment, the voltage gain will also increase with λ, as shown in FIG. 7A, but the output fluctuation is much larger than the other two misalignment cases. Specifically, if $Q_{S0}$ is too small, no λ can be found to meet the minimum voltage requirement. We can only obtain the upper limit of $\lambda_{LM2}$ at the maximum lateral misalignment. Furthermore, the final λ range can be obtained with the λ interaction sets under different misalignment positions. Also, the minimum λ can be used to select the minimum quality factor $Q_{S0min}$ (corresponding to the maximum output power), as shown in FIG. 7A.

Figure 8:
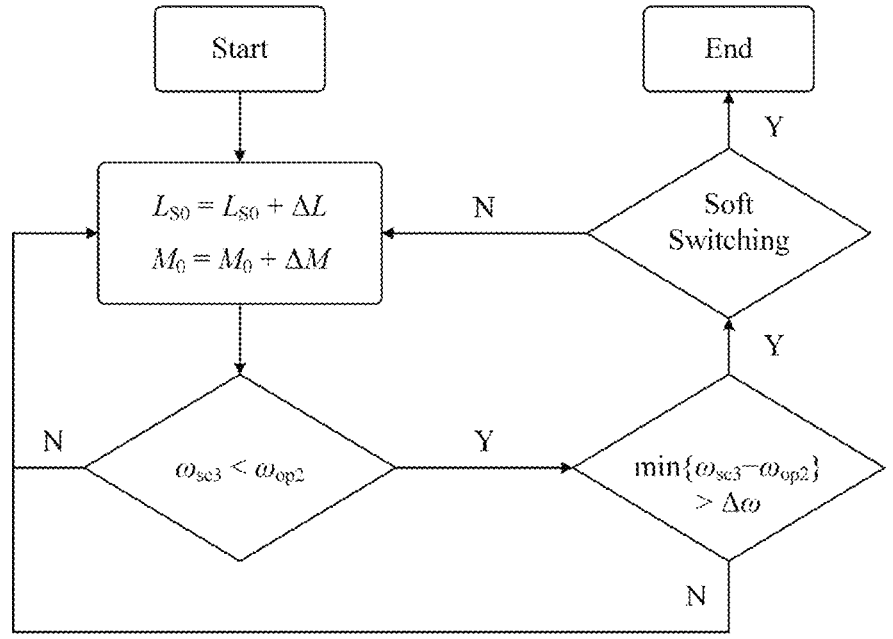
FIG. 8 illustrates a design flow chart for optimizing efficiency of a wireless in-wheel motor drive system.

After selecting the inductance coefficient λ and the quality factor $Q_{S0}$, the self-inductances and mutual inductance of the magnetic coupler are further adjusted to eliminate the terminal effects on soft switching. FIG. 8 illustrates a virtual parameter design method for tuning the self-inductances and mutual inductance of the magnetic coupler in the wireless in-wheel motor drive system. The target is to reduce $\omega_{sc3}$ or increase $\omega_{op2}$. As the decrease of $\delta_s$ can help increase $\omega_{op2}$ and the decrease of $\delta_M$ can help decrease $\omega_{sc3}$, unit virtual parameters: $\Delta_L$ and $\Delta M$ are added to $L_{S0}$ and $M_0$ respectively. As shown in FIG. 8, a unit virtual parameter is added first, and $\omega_{sc3}$ and $\omega_{op2}$ are calculated for different misalignment positions. If $\omega_{sc3} > \omega_{op2}$ only occurs for limited misalignment positions, an additional unit virtual parameter is required. If $\omega_{sc3} < \omega_{op2}$ can be met for all misalignment positions, we calculate the minimum difference between $\omega_{sc3}$ and $\omega_{op2}$ and compare min $\{\omega_{sc3}-\omega_{op2}\}$ with a preset soft switching band Δω. Due to the component tolerances and the parasitic parameters, the soft switching band should not be too small. Otherwise, the soft switching will also be lost in some misalignment positions. If min $\{\omega_{sc3}-\omega_{op2}\} > \Delta\omega$ cannot be met, additional unit virtual parameters will also be added. If the soft switching band condition is met for all misalignment positions, we then check the soft switching realization within the soft switching band frequencies.

10

Figures 9A, 9B, 9C:
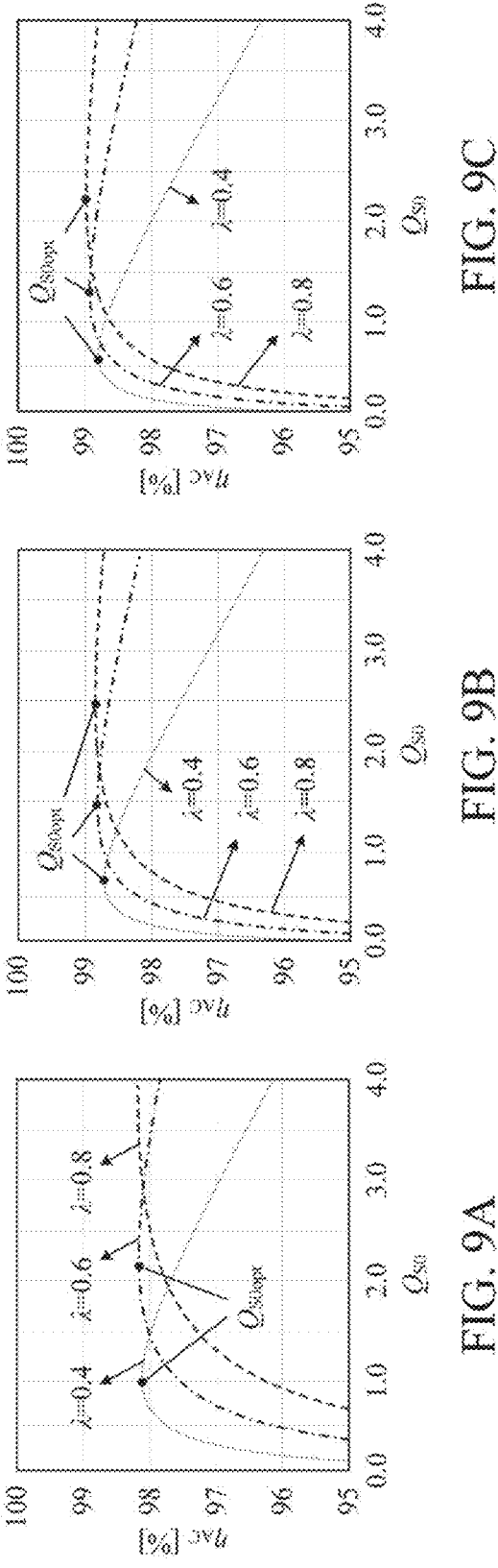
FIGS. 9A-9C illustrate the efficiency properties of the wireless in-wheel motor drive system at the maximum lateral misalignment, no misalignment, and maximum angular misalignment separately.

After selecting the switching frequency within the soft switching band, the optimal load condition can be derived based on (14). FIGS. 9A-9C illustrate the efficiency properties of the wireless in-wheel motor drive system at the maximum lateral misalignment, no misalignment, and maximum angular misalignment separately. It is observed that there exists an optimal load for each misalignment case. However, the system's efficiency experiences a significant decrease under both heavy and light load conditions. Although the light load condition cannot be avoided in practical applications, it is possible to avoid the dramatic efficiency decrease for heavy loads by designing the quality factor $Q_{S0}$ corresponding to the maximum output power near the optimal one $Q_{S0opt}$.

Besides, the maximum power related $Q_{S0}$ may be designed to be smaller than $Q_{S0opt}$ for achieving the maximum efficiency when the vehicle operates below the rated power; and improving the overall efficiency of the system due to the nonmonotonic property.

Finally, the voltage gain, soft switching, and efficiency are checked to determine whether the design requirements are met. If the design results deviate slightly from the limitation, the design can be modified by adjusting λ and $Q_{S0}$. However, if the results significantly exceed the limitation, the coupler parameters have to be modified for iterative design.

In other words, for realizing soft switching and optimizing efficiency of the wireless in-wheel motor drive system, the primary winding and the secondary winding of the magnetic coupler may be pre-misaligned for an angular offset such that an input impedance of the resonant compensation network has a short-circuit boundary frequency $\omega_{sc3}$ less than an open-circuit boundary frequency $\omega_{op2}$ throughout a target misalignment tolerance between the primary winding and the secondary winding. The switching frequency may be selected to be between the short-circuit boundary frequency and the open-circuit boundary frequency. Self-inductances and mutual inductances of the primary winding and the secondary winding may be adjusted with virtual parameters such that a difference between the short-circuit boundary frequency $\omega_{sc3}$ and the open-circuit boundary frequency $\omega_{op2}$ is greater than a target soft switching frequency band throughout the target misalignment tolerance and target operational load conditions.

A prototype of the wireless in-wheel motor drive system has been built for evaluation. The key parameters are listed in Table I.

TABLE I

| Key Parameters of Evaluation Prototypes | | |
|---|---|---|
| | Parameter | Type/value |
| Specification | Input voltage ($V_{in}$) | 120 V |
| | Output voltage ($V_o$) | 160 V-300 V |
| | Output power ($P_o$) | 600 W |
| | Nominal frequency ($f_s$) | 85 kHz |
| Magnetic coupler | Self-inductance ($L_P$) | MLM: 117.7 μH NM: 117.2 μH MAM: 122.1 μH |
| | Self-inductance ($L_S$) | MLM:118.0 μH NM: 117.6 μH MAM: 120.5 μH |
| | Mutual inductance (M) | MLM: 18.93 μH NM: 30.60 μH MAM: 35.75 μH |
| Compensation capacitance | Primary side ($C_P$) | 35.47 nF |
| | Secondary side ($C_r$) | 62.65 nF |
| | Secondary side ($C_S$) | 52.43 nF |
| PMSM | Rated voltage ($V_l$) | 110 VAC |

TABLE I-continued

Key Parameters of Evaluation Prototypes

| Parameter | Type/value |
|---|---|
| Rated torque ($T_R$) | 5.73 N · m |
| Rated speed ($n_R$) | 1000 rpm |

Figures 10A, 10B, 10C, 11A, 11B, 11C:
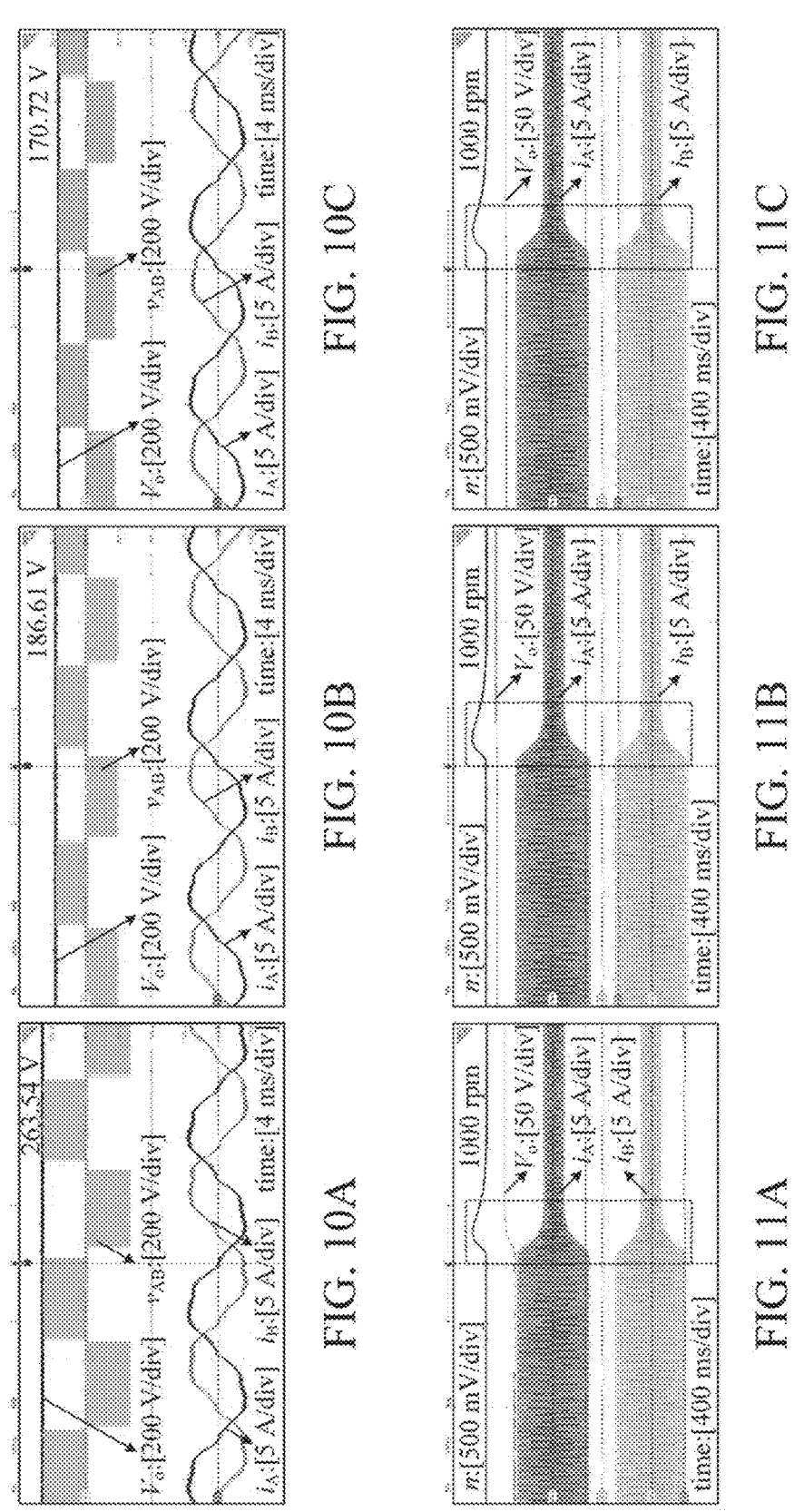
FIGS. 10A-10C show motor steady-state waveforms of the motor being driven by the wireless in-wheel motor drive system at the maximum lateral misalignment, no misalignment, and maximum angular misalignment, respectively.
FIGS. 11A-11C show the motor dynamic waveforms with load steps at the maximum lateral misalignment, no misalignment, and maximum angular misalignment, respectively.

The motor steady-state waveforms at the maximum lateral misalignment, no misalignment, and maximum angular misalignment are shown in FIGS. 10A-10C respectively, where the bus voltage $V_o$, the line voltage $v_{AB}$, and the motor winding currents (or phase currents) $i_A$, $i_B$ are given. The motor operates at a speed of 1000 rpm, with an output power of 300 W. Waveforms of other speeds and power levels are similar and thus omitted here. The waveform results show that the motor can operate well at steady states.

The motor dynamic waveforms with load steps at the maximum lateral misalignment, no misalignment, and maximum angular misalignment are given in FIGS. 11A-11C respectively, including the motor speed n, the bus voltage $V_o$, and the phase currents $i_A$ and $i_B$. The motor reference speed is set as 1000 rpm, and the load torque is changed. At the maximum angular misalignment and no misalignment positions, the bus voltage is only slightly affected by the load step due to the load-independent voltage property. By contrast, the bus voltage has a noticeable change at the maximum lateral misalignment position during the dynamic process. Nevertheless, the motor could always operate stably, and the speed can recover to 1000 rpm following the dynamic process, regardless of the bus voltage variation.

Figures 12A, 12B, 12C:
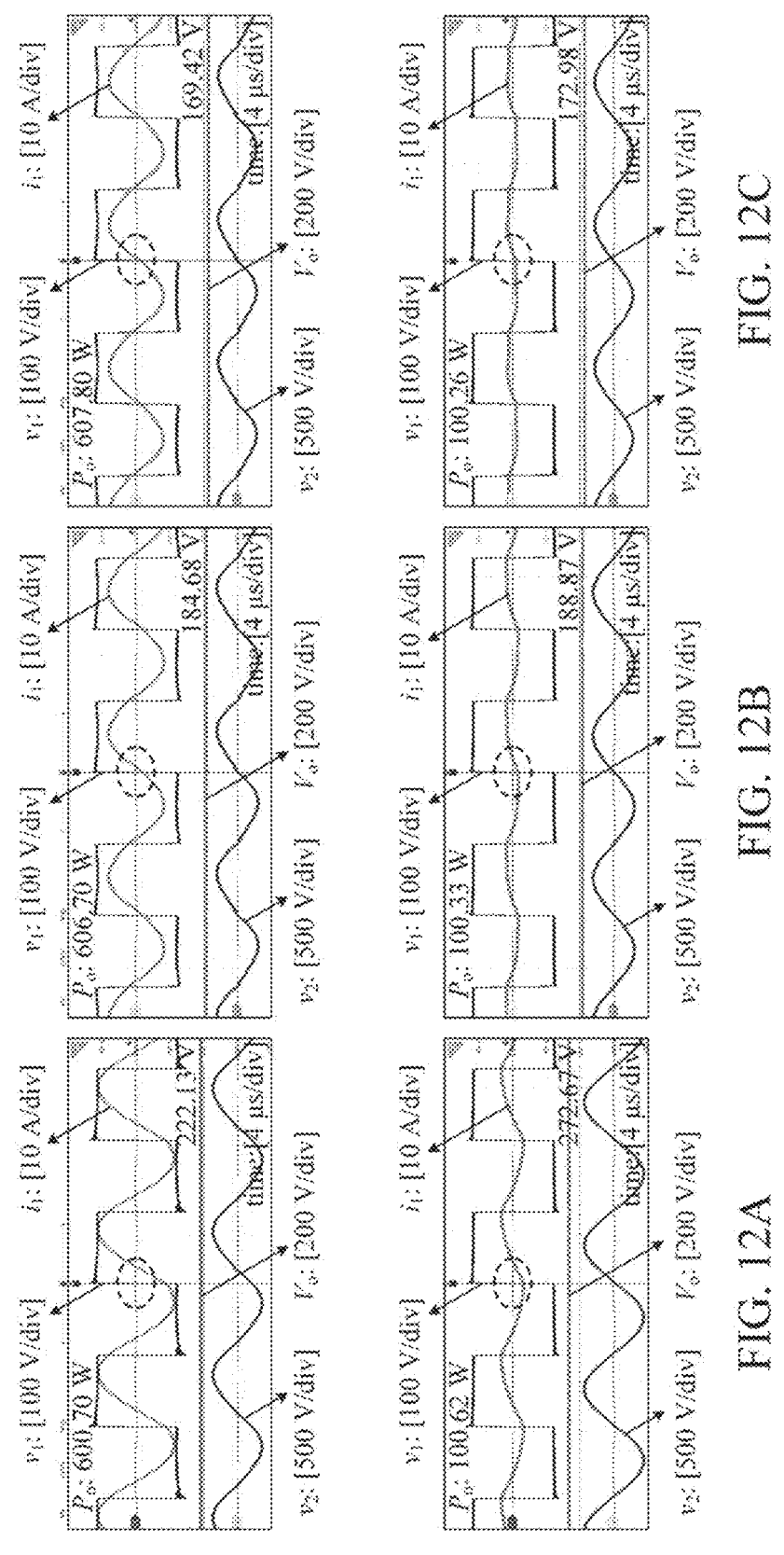
FIGS. 12A-12C show compensation network waveforms of the input voltage $v_1$ and current $i_1$, as well as the output voltage $v_2$ and the bus voltage $V_o$.

Compensation network waveforms of the input voltage $v_1$ and current $i_1$, as well as the output voltage $v_2$ and the bus voltage $V_o$ are shown in FIGS. 12A-12C. Results of three typical misalignment conditions are provided, including the maximum lateral misalignment, the no misalignment, and the maximum angular misalignment. It is seen that the input current $i_1$ always lags behind the input voltage $v_1$ for various misalignment and load conditions, ensuring the soft switching realization.

FIG. 13A illustrates the measured voltage curves against the load variation. It is observed that the bus voltage maintains relatively stable within a wide range of misalignments, spanning from the maximum angular misalignment to a lateral misalignment of 40 mm. However, a significant voltage fluctuation occurs at the maximum lateral misalignment. FIG. 13B illustrates the measured voltage curves against the coupling coefficient variation. It shows that a decrease in the coupling coefficient will increase the bus voltage, and the voltage variation will reduce as the output power increases. Nevertheless, the bus voltage can always be within the design limits of 160 V-300 V.

FIGS. 14A and 14B illustrate measured AC efficiency and DC efficiency curves of the wireless in-wheel motor drive system. The maximum DC efficiency is 96.81% with 400 W output, associated with an AC efficiency of 98.91%. As shown in FIG. 14B, the DC efficiency can always be larger than 92% for different misalignment conditions when the output power is over 200 W. The measured curves indicate the high-efficiency performance of the wireless in-wheel motor drive system.

While the present disclosure has been described and illustrated with reference to specific embodiments thereof, these descriptions and illustrations are not limited. The illustrations may not necessarily be drawn to scale. There may be distinctions between the artistic renditions in the present disclosure and the actual apparatus due to manufacturing processes and tolerances. There may be other embodiments of the present disclosure which are not specifically illustrated. Modifications may be made to adapt a particular situation, material, composition of matter, method, or process to the objective and scope of the present disclosure. All such modifications are intended to be within the scope of the claims appended hereto. While the methods disclosed herein have been described with reference to particular operations performed in a particular order, it will be understood that these operations may be combined, subdivided, or re-ordered to form an equivalent method without departing from the teachings of the present disclosure. Accordingly, unless specifically indicated herein, the order and grouping of the operations are not limited.

What is claimed is:

1. A wireless soft-switching in-wheel motor drive system, comprising:

a vehicle-body side including a vehicle-body-side series resonant capacitor $C_P$;

a wheel side including a wheel-side series resonant capacitor $C_r$ and a wheel-side parallel resonant capacitor $C_S$; and a magnetic coupler configured for transferring power from the vehicle-body side to the wheel side under a switching frequency, including:

a primary winding electrically connected in series to the vehicle-body-side series resonant capacitor $C_P$; and a secondary winding electrically connected in series to the wheel-side series resonant capacitor $C_r$ and in parallel to the wheel-side parallel resonant capacitor $C_S$;

wherein:

a resonant compensation network is formed of the vehicle-body-side series resonant capacitor $C_P$, the wheel-side series resonant capacitor $C_r$, the wheel-side parallel resonant capacitor $C_S$, a self-inductance $L_p$ of the primary winding, a self-inductance $L_S$ of the secondary winding and a mutual inductances M between the primary winding and the secondary winding;

the primary winding and the secondary winding are pre-misaligned with an angular offset such that an input impedance of the resonant compensation network has a short-circuit boundary frequency $\omega_{sc3}$ less than an open-circuit boundary frequency $\omega_{op2}$ throughout a target misalignment tolerance between the primary winding and the secondary winding; and the switching frequency is selected between the short-circuit boundary frequency and the open-circuit boundary frequency; and the self-inductances and mutual inductances of the primary winding and the secondary winding are adjusted with virtual parameters such that a difference between the short-circuit boundary frequency $\omega_{sc3}$ and the open-circuit boundary frequency $\omega_{op2}$ is greater than a target soft switching frequency band throughout the target misalignment tolerance and target operational load conditions.

2. The wireless soft-switching in-wheel motor drive system according to claim 1, wherein the vehicle-body side further includes:

a DC voltage source;

a voltage source inverter electrically connected between the DC voltage source and the vehicle-body-side series resonant capacitor $C_P$ and configured for converting a DC voltage from the DC voltage source to an AC voltage; and a vehicle-body-side controller electrically connected to the voltage source inverter and configured to generate control signals for controlling the voltage source inverter.

3. The wireless soft-switching in-wheel motor drive system according to claim 2, wherein the vehicle-body side further includes a current protection module comprising:

a first AC current sensor configured for detecting a current flowing through the primary winding; and a comparator configured for determining whether the detected current exceeds a threshold value;

wherein the vehicle-body-side controller is configured to generate an overcurrent protection signal for turning off the voltage source inverter when the detected current is determined to exceed the threshold value.

4. The wireless soft-switching in-wheel motor drive system according to claim 2, wherein the voltage source inverter is a half-bridge inverter, a full-bridge inverter or a push-pull inverter.

5. The wireless soft-switching in-wheel motor drive system according to claim 1, wherein the wheel side further includes:

a rectifier module electrically coupled to the wheel-side parallel resonant capacitor $C_S$ and configured for converting a high frequency AC voltage into DC voltage;

a motor drive module electrically connected to the rectifier module and configured for converting the DC voltage received from the rectifier module to a low-frequency AC driving voltages for driving an in-wheel motor; and a wheel-side controller electrically connected to the motor drive module and configured for controlling the motor drive module.

6. The wireless soft-switching in-wheel motor drive system according to claim 5, wherein the wheel side further includes a wheel-side sensing circuit comprising:

a DC voltage sensor configured to detect a DC voltage generated by the motor drive module;

a second AC current sensor configured to detect an AC current supplied by the motor drive module to the in-wheel motor;

a DC current sensor configured to detect a DC current indicative of position $\theta$ and speed n of the in-wheel motor; and an encoder configured to encode the detected DC current to obtain the motor position $\theta$ and speed n of the in-wheel motor.

7. The wireless soft-switching in-wheel motor drive system according to claim 5, wherein the rectifier module has a full-bridge structure, a half-bridge structure, a full-wave structure, a voltage-doubler structure or a current-doubler structure.

8. The wireless soft-switching in-wheel motor drive system according to claim 5, wherein the motor drive module is configured as a voltage source inverter, a current source inverter or a matrix converter.

9. The wireless soft-switching in-wheel motor drive system according to claim 5, wherein the wheel-side controller is configured to implement a field-oriented control algorithm, a direct torque control algorithm, an adaptive control algorithm or a robust control algorithm for controlling the motor drive module.

10. The wireless soft-switching in-wheel motor drive system according to claim 5, wherein the wheel-side controller is configured to implement a sinusoidal pulse width modulation strategy, a harmonic injection sinusoidal pulse width modulation strategy or a space vector pulse width modulation strategy for controlling the motor drive module.

11. A method for realizing soft switching and optimizing efficiency of a wireless in-wheel motor drive system comprising a vehicle-body side, a wheel side and a magnetic coupler configured for transferring power from the vehicle-body side to the wheel side under a switching frequency; the method comprising:

forming a resonant compensation network by:

electrically connecting a primary winding of the magnetic coupler n series to a vehicle-body-side series resonant capacitor $C_P$; and electrically connecting a secondary winding in series to a wheel-side series resonant capacitor $C_r$ and in parallel to a wheel-side parallel resonant capacitor $C_S$;

pre-misaligning the primary winding and the secondary winding of the magnetic coupler for an angular offset such that an input impedance of the resonant compensation network has a short-circuit boundary frequency $\omega_{sc3}$ less than an open-circuit boundary frequency $\omega_{op2}$ throughout a target misalignment tolerance between the primary winding and the secondary winding;

selecting the switching frequency to be between the short-circuit boundary frequency and the open-circuit boundary frequency; and adjusting self-inductances and mutual inductances of the primary winding and the secondary winding with virtual parameters such that a difference between the short-circuit boundary frequency $\omega_{sc3}$ and the open-circuit boundary frequency $\omega_{op2}$ is greater than a target soft switching frequency band throughout the target misalignment tolerance and target operational load conditions.

* * * * *